March 20, 1951     A. R. HUTT     2,545,663
APPARATUS FOR INTRODUCING GASES INTO MOLTEN METAL
Filed June 26, 1947     2 Sheets-Sheet 1
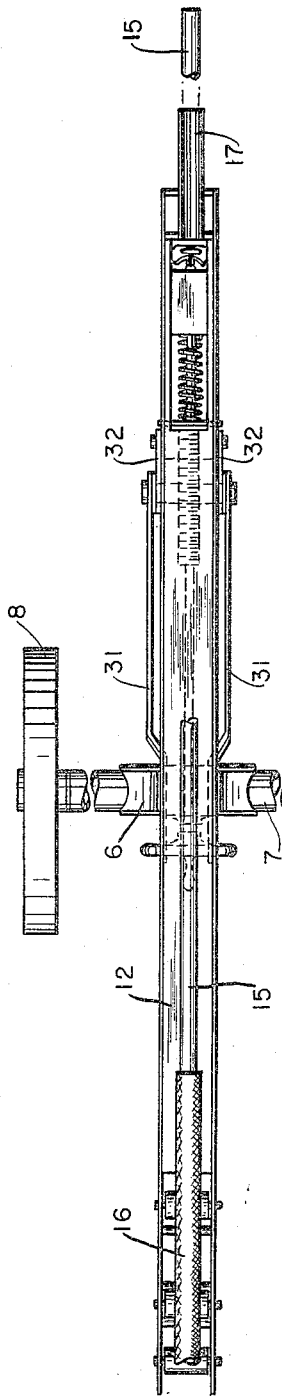
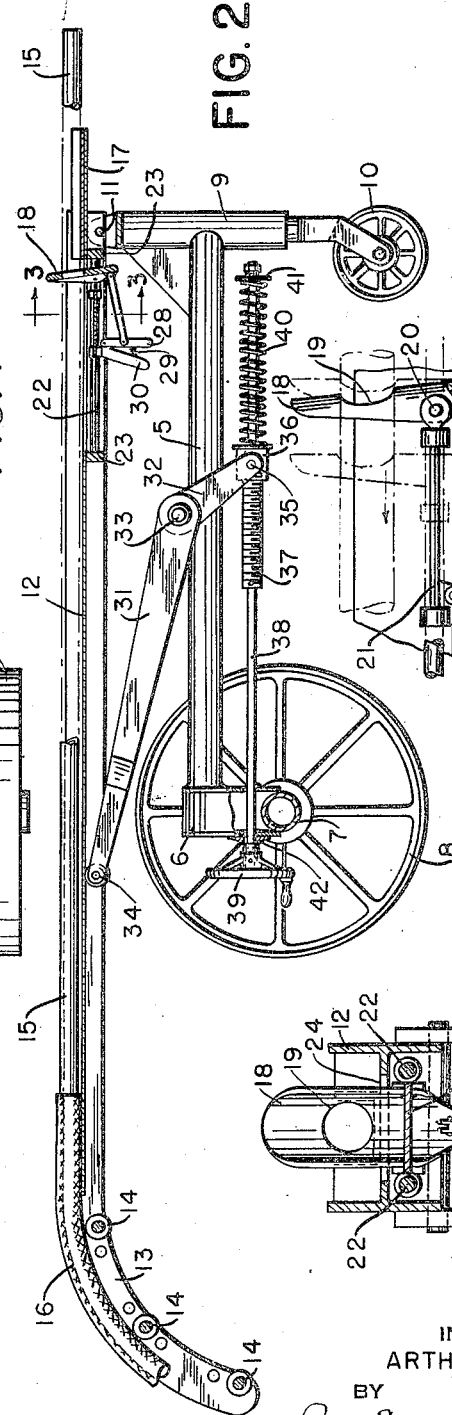
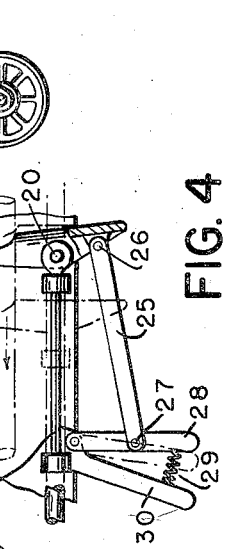
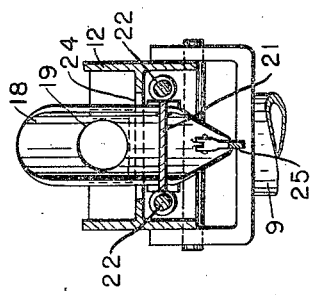
INVENTOR
ARTHUR R. HUTT
BY
ATTORNEYS

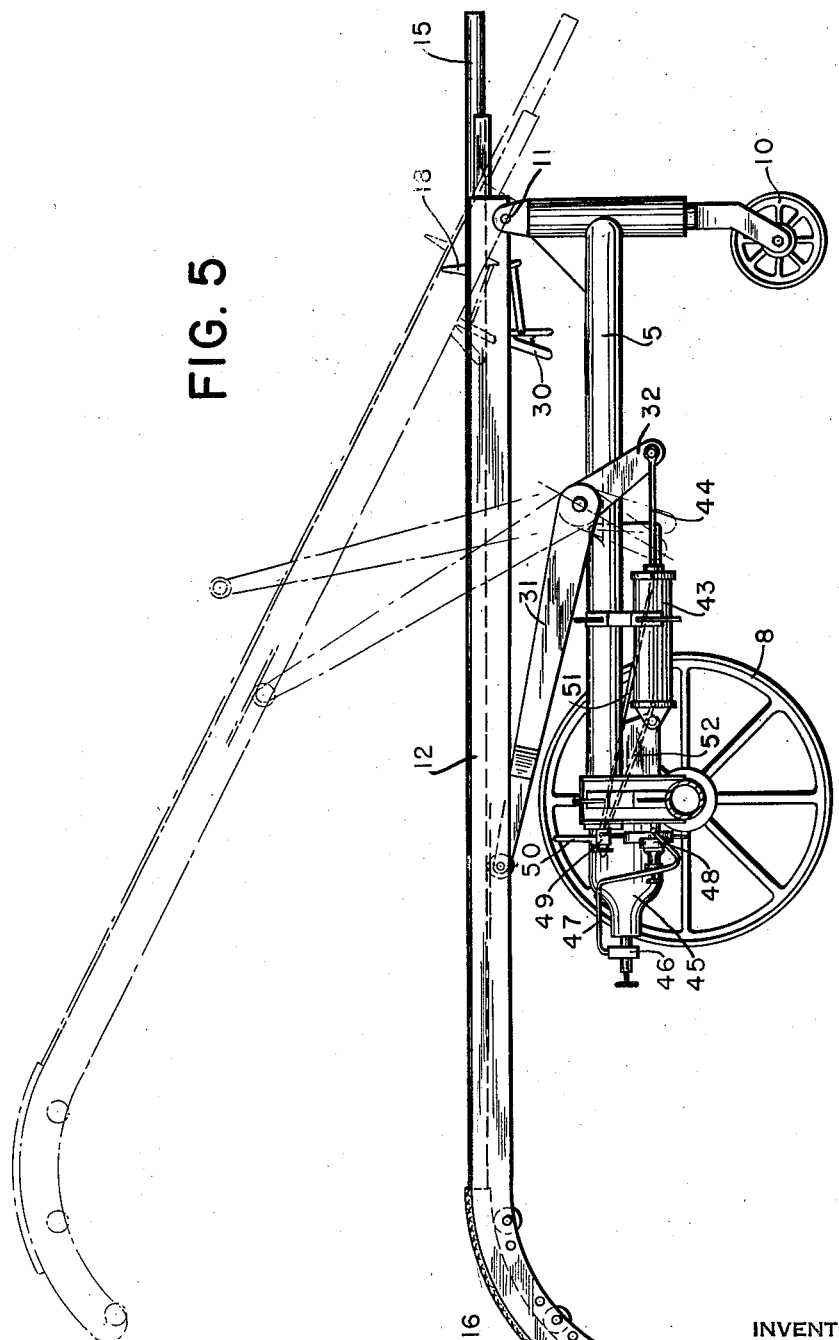

Patented Mar. 20, 1951

2,545,663

UNITED STATES PATENT OFFICE 2,545,663

APPARATUS FOR INTRODUCING GASES INTO MOLTEN METAL

Arthur R. Hutt, Hopatcong, N. J., assignor to Air Reduction Company, Incorporated, New York, N. Y., a corporation of New York Application June 26, 1947, Serial No. 757,212

7 Claims. (Cl. 214—18)

This invention relates to the introduction of gases into molten metal, and particularly to an apparatus adapted to facilitate the introduction of oxygen to molten steel in an open hearth furnace, although the apparatus may be employed in similar operations with other metals.

Slottman, in an application Ser. No. 728,868, filed February 15, 1947, entitled "Manufacture of Open Hearth Steel," has described a novel procedure for the reduction of the carbon content of the steel. In accordance with the procedure described in the application, after other impurities have been eliminated in accordance with the usual open hearth practice, oxygen is introduced to the molten steel through a metal pipe extending through the slag layer into the steel. Oxygen is introduced at a rate such that ignition of the metal pipe is avoided. Nevertheless the end of the pipe is consumed by melting at a more or less constant rate, so that as the operation continues the pipe must be fed forwardly and into the molten bath.

Thus, a twenty-foot length of iron pipe will be about two-thirds consumed in from eight to twelve minutes. During this interval, such a pipe, having an internal diameter of one inch, will pass about 3330 cubic feet of oxygen (at 70° F. and 1 atmosphere) at an apparent linear velocity of 1010 feet per second. When oxygen is introduced at this rate, the efficiency of the reaction with carbon is close to 100% as long as the carbon content of the metal remains above 0.1%. Above this concentration of carbon, reaction takes place over the entire body of the metal, and carbon monoxide is given off in tiny bubbles bursting through the slag over its entire surface. Below 0.1%, the efficiency of oxygen usage in eliminating carbon falls off until, around 0.03% carbon, the efficiency is about 30% when using only one pipe. At this time, the greater portion of the area of the bath lies quietly and the only evidence of carbon monoxide evolution is in a limited area where the pipe is working. Efficiency can be increased in this range (i. e. below 0.1%) if the number of pipes is increased so that the distance through which the oxygen must diffuse to meet the carbon is decreased.

It is essential that the end of the pipe be held within the molten metal below the slag level. It must not, however, approach too closely to the hearth, since the oxygen in that event will be consumed with possible damage to the hearth. The handling of a twenty-foot pipe in the manner outlined usually requires two operators in order that the oxygen may be delivered with certainty to the molten metal without waste or destruction of the hearth. The operators are necessarily exposed to excessive heat, and the resulting fatigue. The operation is therefore relatively arduous.

It is the object of the present invention to provide a simple and effective apparatus which will facilitate the handling of the oxygen pipe, permit handling of the pipe by a single operator and materially reduce the labor involved, with better assurance of the application of the oxygen or other gas supplied in the most economical manner.

Other objects and advantages of the invention will be apparent as it is better understood by reference to the following specification and the accompanying drawing, in which Fig. 1 is a plan view of a preferred form of the apparatus;

Fig. 2 is an elevation partially in section of the structure shown in Fig. 1;

Fig. 3 is an enlarged sectional view on the line 3—3 of Fig. 2;

Fig. 4 is an enlarged view in elevation of a portion of the apparatus of Fig. 2; and Fig. 5 is an elevation illustrating a modified form of the construction.

Referring to the drawing, the apparatus comprises a dirigible chassis which may consist of a longitudinally tubular member 5 connected, at its rear end, to a transverse member 6 carrying an axle 7 upon which wheels 8 are journalled, and at its forward end, a vertically tubular member 9 supported on a wheel 10 which is pivotally mounted in the member 9 as a caster. Thus, the chassis may be moved about readily to bring the apparatus into proper alignment for its intended use.

Pivoted at 11 on the member 9 is a longitudinally extending pipe support 12, preferably formed of a channel member such as an I-beam. The pipe support has a curved extension 13 at its rearward end, carrying anti-friction rollers 14. The pipe support 12 is adapted to receive the injection pipe 15 having a hose 16 connected thereto and to a source of the gas to be handled. As indicated, the hose rests upon the rollers 14 and is adapted to move thereover without kinking as the injection pipe 15 is advanced in the performance of its function. At the forward end, the pipe support carries a replaceable section 17 which may extend to the edge of the opening in the furnace (not shown), into which the injection pipe 15 is introduced. When the extension 17 is damaged, as it may be by heat or otherwise, it can be removed and replaced.

The injection pipe 15 is held upon the pipe support 12 by a clamp or gripping member 18 (Fig. 4) having an opening 19 therein slightly larger than the diameter of the injection pipe 15 so that it will grip the pipe when the clamp is in an angular position. The clamp 18 is pivoted at 20 on the end of a cross-head 21 slidably mounted on rods 22 (Fig. 3) which are secured to brackets 23 on the under side of the support 12. The clamp extends upwardly through a slot 24 in the support 12 and is movable longitudinally in the slot with the cross-head 21. The clamp 18 is normally held in clamping position by a link 25 pivoted at 26 thereto, and at 27 to a handle 28 which is biased forwardly by a spring 29 bearing against a member 30 secured to the cross-head 21. By gripping the handle 28, the spring 29 may be compressed, thus swinging the clamp 18 slightly about its pivot 20 and thereby releasing the pipe. The cross-head 21 and the clamp 18 may then be moved rearwardly in the slot 24. When the handle 28 is released, the clamp 18 will again grip the pipe which may be moved forwardly by pushing the member 30. The clamp 18 and its associated operating mechanism thus compose a pipe clutch which may be operated to feed the injection pipe 15 forwardly as required during the operation.

In order that the end of the injection pipe may be introduced beneath the surface of the molten metal in the furnace, it is necessary to swing it about its pivot 11. This is accomplished by means of arms 31 and 32 supported to pivot at 33 on the chassis. The arms 31 and 32 form together a bell crank lever, one end of which engages at 34 the pipe support 12, and the other at 35 to a nut 36 which is mounted on a threaded portion 37 of a rod 38. The rod is mounted in the member 6 and carries a hand wheel 39 permitting rotation thereof. A compression spring 40 is supported on the rod 38 between a washer 41 and the nut 36 and is of sufficiently greater diameter than the threaded portion 37 of rod 38 to slide thereover. A collar 42, adjacent the member 6, takes the thrust of the spring 40 which tends to force the rod 38 forwardly, so that the washer 41 is fixed relative to the member 6. The weight of the pipe support is transmitted through the bell crank lever arms 31 and 32 as a force on the nut 36 tending to force the nut forwardly against the threads of the threaded portion 37 of the rod 38. The spring 40 applies an opposing force to the nut 36 to oppose this weight force and reduce the stress on the threads. By turning the hand wheel 39 and thus swinging the bell crank lever on its pivot 33, the pipe support 15 may be swung about its pivot 11 to the proper angle.

This operation is indicated in Fig. 5 of the drawing, showing a slightly modified form of the invention. The same reference numerals are applied to the various identical parts and description thereof need not, therefore, be repeated. The only difference in the mechanism involves the application of power to swing the pipe support 12 to its angular position.

In this case, power is applied through a cylinder 43 and piston 44, the end of which is pivotally connected to the arms 32. The piston may be actuated in any suitable manner. Conveniently a receptacle 45 for gas under pressure, nitrogen for example, may be supported on the chassis and connected through a valve 46 and pipe 47 to a pressure reducing valve 48. From the pressure reducing valve, the gas is delivered to a two-way valve 49 having an operating handle 50. The latter valve is connected by pipes 51 and 52 to the cylinder 43. By manipulating the valve 49, the gas under pressure may be delivered to either end of the cylinder while gas in the other end is exhausted to the atmosphere. The operator is thus enabled to control with ease the swinging of the pipe support 12 about its pivot 11. Feeding of the injection pipe 15 is accomplished as in the preceding embodiment of the invention.

Among the advantages of the device, are the ease of operation to maintain the injection pipe 15 at the desired angle and to feed it forwardly as may be required. With the exception of the hose 16, which is connected to the source of gas under pressure, there are no connections to become entangled during the movement of the device.

Various changes may be made in the form, arrangement and construction of the parts without departing from the invention or sacrificing the advantages thereof.

I claim:

1. An apparatus for placing a fluid supply pipe in proper position to supply fluid to a metallurgical furnace comprising a dirigible chassis, an elongated support for the pipe pivotally mounted on the chassis, a lever means engaging said pipe support at a point remote from its pivot point, actuation of said lever means causing tilting movement of the pipe support about its pivot, and a pipe clutch mounted on said pipe support arranged to selectively grip and advance the pipe along the pipe support.

2. The apparatus defined in claim 1 in which said pipe clutch comprises a gripping member pivotally mounted on the pipe support and means operatively connected to said gripping member operable to cause pivotal movement thereof into and out of engagement with pipe carried by the pipe support.

3. The apparatus defined in claim 2 in which said gripping member and its operating means are longitudinally movable relative to the pipe support, whereby the pipe may be advanced along the pipe support by longitudinal movement of the gripping member in its pipe-engaging position relative to the pipe support.

4. The apparatus defined in claim 1 having means for actuating said lever means and means to oppose the force exerted on said actuating means through the lever means by the weight of the pipe support.

5. The apparatus defined in claim 1 in which said means for causing tilting movement of the pipe support comprises a bell crank lever pivoted on the chassis and having one arm contacting the pipe support and means for moving the other arm of said bell crank lever to cause movement of the first-mentioned arm thereof.

6. The apparatus defined in claim 1 having means mounted on the pipe support over which the pipe passes during advancement of the pipe along the support to reduce the frictional force exerted on the pipe by the pipe support.

7. The apparatus defined in claim 1 having a replaceable extension member mounted on the forward end of said pipe support for supporting the part of the pipe located nearest the furnace.

ARTHUR R. HUTT.

REFERENCES CITED

The following references are of record in the file of this patent:

UNITED STATES PATENTS

| Number | Name | Date |
|---|---|---|
| 455,485 | Harris | July 7, 1891 |
| 530,834 | Gaiser | Dec. 11, 1894 |
| 707,951 | Alexander | Aug. 26, 1902 |
| 1,028,523 | Anderson | June 4, 1912 |
| 2,355,341 | Trimbach | Aug. 8, 1944 |
| 2,396,614 | Somes | Mar. 12, 1946 |